Patented Oct. 20, 1953

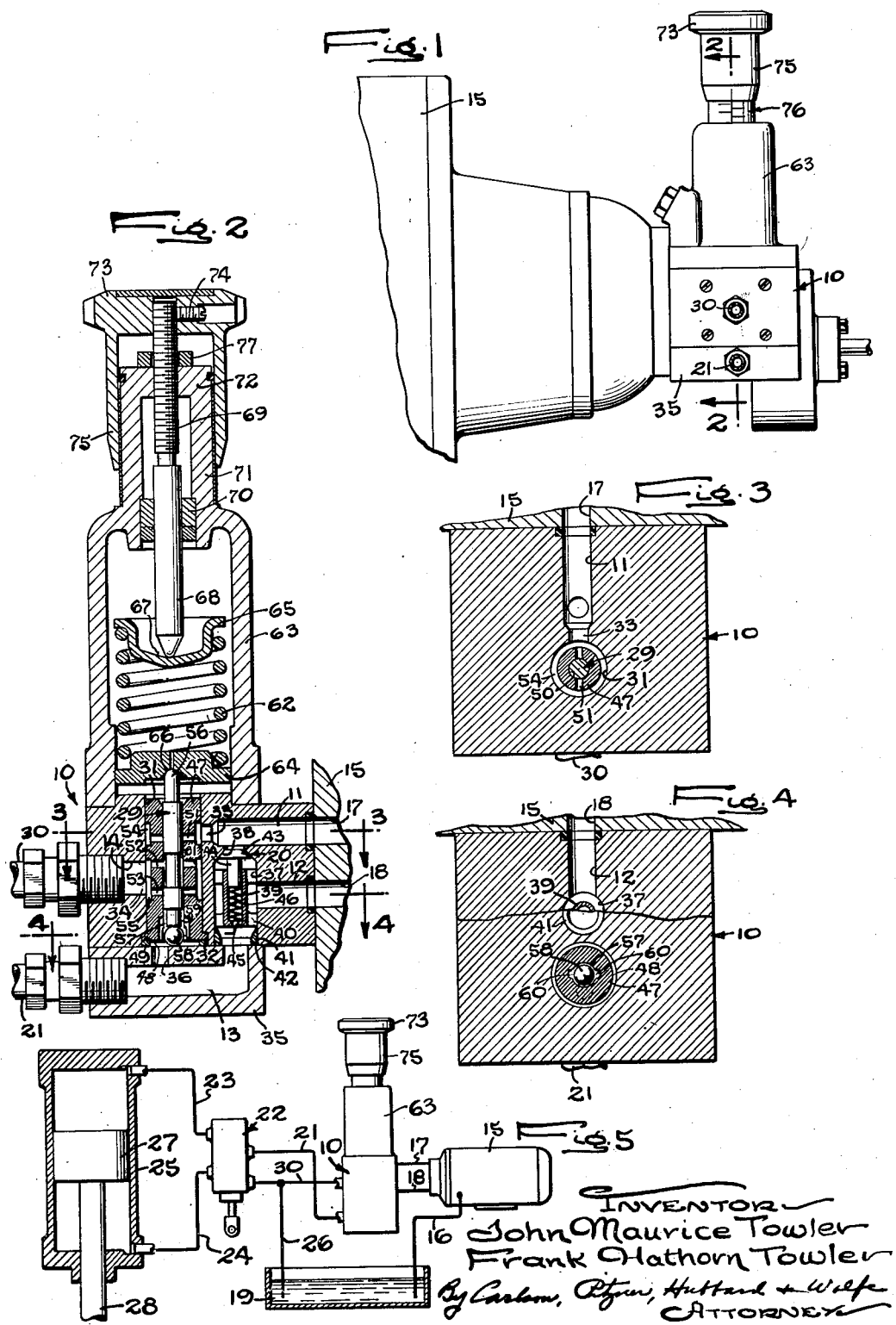

2,655,930

UNITED STATES PATENT OFFICE 2,655,930

UNLOADING AND RELIEF VALVE

John Maurice Towler, Rodley, and Frank Hathorn Towler, Dob Park, near Otley, England, assignors to Electraulic Presses Limited, Rodley, England, a corporation of England Application August 24, 1950, Serial No. 181,172

4 Claims. (Cl. 137—108)

1

The present invention relates to a new and improved unloading and relief valve.

One of the objects of the present invention is to provide an unloading and relief valve which is operative automatically to pass a relatively large aggregate volume of pressure fluid from a plurality of sources and, as the volumetric requirements are reduced, to unload part of these sources and to sustain the pressure developed by the remaining part of these sources.

A more specific object is to provide an unloading and relief valve which is operable to receive pressure fluid from two sources, to combine the delivery from the two sources during relatively low pressure conditions, to unload one of these sources through by-passing the delivery thereof upon a predetermined increase in the developed pressure, and to sustain the pressure developed by the other source at a predetermined peak level through a relief valve action.

A further object is to provide a unitary valve of the foregoing character which is simple and inexpensive in construction, and efficient and reliable in operation.

Other objects and advantages will become apparent as the description proceeds.

In the accompanying drawings:

Fig. 1 is a side elevational view of a valve embodying the features of the present invention.

Fig. 2 is a longitudinal sectional view of the valve taken substantially along line 2—2 of Fig. 1.

Figs. 3 and 4 are transverse sectional views taken respectively along line 3—3 and 4—4 of Fig. 2.

Fig. 5 is a simple diagrammatic representation of the valve of Fig. 1 operatively connected in a hydraulic transmission circuit.

Referring more particularly to the drawings, the combined unloading and relief valve, constituting the exemplary embodiment of the present invention, comprises a valve body 10 formed with two separate inlet passages 11 and 12, a pressure delivery passage 13 and an exhaust passage 14. The passages 11 and 12 are adapted for connection respectively to two sources of pressure fluid. Preferably, one of these sources has a relatively large volume capacity or output, and the other has a relatively small volume capacity or output. For example, the valve of the present invention may be used very advantageously with a dual pump 15 having relatively large and small displacement pump units integrated in a unitary or self-contained structure, but having a common intake conduit 16 and independent delivery conduits 17 and 18. These pump units constitute

2 pressure fluid sources of the foregoing character, and are connected through the conduits 17 and 18 respectively to the valve inlets 11 and 12.

The details of construction of the dual pump 15 are not directly related to the present invention, and hence are not fully disclosed herein. Briefly stated, the pump 15 takes fluid through the conduit 16 from a sump 19, and comprises a plurality of parallel annularly-arranged plungers (not shown) reciprocable through the action of a wobble plate (not shown). The plungers of the annular series are alternately large and small in diameter, the large plungers delivering fluid to a manifold connected with the conduit 17 and hence constituting the large displacement unit, and the small plungers delivering fluid to another manifold connected with the conduit 18 and hence constituting the small displacement unit. More particularly, the pump 15 is of the form disclosed in our copending application, Serial No. 122,698, filed October 21, 1949, to which reference may be had for a more complete understanding.

Referring back to the valve body 10, the inlet passage 12 is in constant communication with the delivery passage 13, and the inlet passage 11 is adapted for connection therewith through a check valve 20. The delivery passage 13 is adapted for connection through an outlet conduit 21 to that portion of the hydraulic system in which the fluid is to be utilized for performing work. In the simple system herein shown for illustrative purposes, the conduit 21 is connected to a direction control valve 22 which is adjustable to direct the pressure fluid selectively through either one of two conduits 23 and 24 to the related end of a motor cylinder 25, and to pass fluid from the other end of the cylinder through the other of the motor conduits to a drain conduit 26 leading to the sump 19. A piston 27 is operatively reciprocable in the cylinder 25 and has an axial piston rod 28 projecting therefrom for performing work. The hydraulic motor 25, 27 may be utilized for actuating machine elements having heavy duty requirements, as, for example, the movable head of a large press (not shown).

The unloading and relief valve of the present invention also comprises valve means including a movable valve element 29 which is normally biased into one extreme position to cause the full delivery of fluid from both passages 11 and 12 to the passage 13, but which is operable, in response to a progressive pressure rise in the latter passage, first, at a predetermined adjustable pressure designated for convenience as $P_1$, to connect the passage 11 to the exhaust passage 14, thereby unloading the delivery of the large-volume-displacement unit of the pump 15, and then, at a higher predetermined pressure designated for convenience as P2, to relieve excess fluid from the passages 12 and 13 to the exhaust passage, whereby to limit the pressure in the system. The passage 14 is adapted for connection to a conduit 30 which may lead to any suitable point of fluid disposal, such as the sump 19.

It will thus be evident that the valve is operative to pass the entire delivery of both fluid sources as long as the volumetric requirements of the system remain large, then to by-pass the major portion of this delivery without the excessive expenditure of energy when these requirements are substantially reduced, and finally to relieve the remaining portion of this delivery to whatever extent is necessary to limit the top working pressure as these requirements are further reduced or satisfied.

Within the broad aspects of the invention, the valve, and its various component parts, may be of any suitable form or character. In the preferred form, the valve body 10 comprises a rectangular block having a bore 31, with a counterbore 32 in one end, opening therethrough, and having the passages 11, 12 and 14 formed therein transaxially of, and in axially spaced relation along the bore 31. The passages 11 and 12 are parallel and located in a common plane, and the passages 11 and 14 are open at their inner ends through ports 33 and 34 to the bore 31. A rectangular block 35, formed with the delivery passage 13, is bolted to the underside of the block 10 in position to close one end of the bore 31, except for a port 36 opening from the passage to the bore.

The body block 10 is additionally formed with a bore 37 parallel to the bore 31 and constituting the chamber for the check valve 20. This bore 37 opens to the delivery passage 13, intersects with the passage 12, and connects through a conical valve seat 38 at one end with the passage 11. A tubular guide sleeve 39 is mounted coaxially within the bore 37, and is formed on the outer periphery at opposite ends with circumferentially-spaced locating lugs 40 permitting the free passage of fluid thereabout from the passages 11 and 12 to the passage 13. The lugs 40, at one end engage the seat 38, and at the other end are engaged by a holding ring 41. A joint ring 42 is snugly interposed between the ring 41 and the delivery block 35 so that the latter serves to maintain the parts in assembly. The check valve 20 comprises a valve member 43 having a stem 44 slidably guided in one end of the sleeve 39, and normally engaging the seat 38. The other end of the sleeve 39 is closed, except for a vent opening 45, and a coiled compression spring 46 disposed therein tends to urge the valve member 43 outwardly into seated position.

A valve bushing 47 is tightly fitted within the bore 31, and has a peripheral locating flange 48 on one end seating in the counterbore 32. A joint ring 49 is interposed between the flange 48 and block 35 to hold the parts in assembly. The bushing 47 has an axial valve bore 50 opening therethrough, and three axially-spaced sets of radial ports 51, 52 and 53 opening to the bore. The set of ports 51 communicate with an outer peripheral groove 54 in the bushing 47 in registration with the port 33 of the passage 11. The other two sets of ports 52 and 53 communicate with an outer peripheral groove 55 in the bushing 47 in registration with the port 34 of the passage 14.

A valve plunger 56 is slidably adjustable in the bore 50. One end of the plunger 56 projects into a counterbore 57 in communication through the port 36 with the pressure passage 13. This end of the plunger 56 normally seats against a ball 58 in the counterbore 57, and is formed with a peripheral recess 59 movable into communication with the ports 53 to provide for pressure relief. Two small bores 60 intersect opposite sides of the counterbore 57 to provide a free path of flow about the ball 58 so that the end of the plunger 56 is constantly exposed to the pressure of the fluid in the passage 13. Intermediate its ends, the plunger 56 is formed with a wide peripheral recess 61 always open to the ports 52 and movable into communication with the ports 51 to establish the by-pass for unloading the passage 11.

The other end of the valve plunger 56 projects from the bushing 47, and is subjected endwise to the action of a coiled compression spring 62 normally maintaining it in abutting engagement with the ball 58 in which position it blocks the flow of fluid through the bore 50. The recesses 59 and 61 are so located that in the continued movement of the plunger 56 in response to a rising pressure gradient in the counterbore 57 acting against the force of the spring 62, the recess 61 will open to the ports 51 before the recess 59 opens to the ports 53.

The spring 62 is suitably enclosed in an oil filled casing 63 bolted on the body 10 in axial alignment with the valve bore 50. The spring 62 is interposed between and in abutting engagement at opposite ends with two retainer pads 64 and 65. One of these pads, e. g. the pad 64 is slidable in the lower end of the casing 63 and has an axial seating recess 66 engaging the contiguous end of the valve plunger 56. The other pad 65 has a centering depression 67 engageable by the conical end of a stem 68 on an adjusting screw 69. The stem 68 extends slidably and rotatably through a guide bushing 70 into a tubular projection 71 on the free end of the casing 63. The screw 69 extends through and is in threaded engagement with an outer end wall 72 of the projection 71. A hand knob 73 is fixed, as by means of a set screw 74, to the outer end of the screw 69 and affords means for turning the latter to adjust the pressure of the spring 62 at will to suit the required operation. The knob 73 is provided with a micrometer screw 75 which telescopes with the tubular projection 71 and coacts with a suitable scale 76 on the latter to indicate the degree of adjustment. A stop washer 77, on the end of the projection 71, is engageable by the inner face of the knob 73 to limit the degree of adjustment, and may be provided in different thicknesses so as to permit selective variation of the limit of adjustment.

The operation will be evident from the foregoing description, and briefly summarized is as follows: Assuming that the motor 25, 27 is utilized for operating the ram of a press, the pressure fluid from both units of the pump 15, supplied through the passages 11 and 12, will be delivered through the passage 13 to advance the ram in a rapid approach movement. As the ram encounters increasing working resistance, the pressure in the passage 13 will rise, and this will ordinarily be accompanied by a reduction or elimination of ram movement with a corresponding reduction in volumetric fluid requirement. Consequently, as the fluid pressure in the rising gradient reaches the predetermined value $P_1$, the valve plunger 56 will move out of idle position against the force of the spring 62 to interconnect the ports 51 and 52 through the recess 61 and thereby fully unload the passage 11 to the exhaust passage 14. Thereupon, the check valve 20 will be maintained closed, and only the fluid from the passage 11 will be supplied to the delivery passage 13. The fluid thus available from the small volume unit will be sufficient to actuate or hold the press ram as may be required. Upon continued rise in the fluid pressure to the predetermined value $P_2$, the valve plunger 56 will be displaced still further to interconnect the delivery passage 13 and exhaust passage 14 through the recess 59 and thereby provide fluid relief. The relief passage will be opened more or less to pass such part or all of the available fluid as may be required to establish a state of equilibrium between the fluid pressure and the spring force, thereby sustaining the pressure $P_2$ as a holding force.

The pressure values $P_1$ and $P_2$ are susceptible of relative variation by selective spacing of the recesses 59 and 61 in relation to the ports 53 and 51. For example, if the recesses 59 and 61 are arranged to open substantially simultaneously to the ports 53 and 51, the pressures $P_1$ and $P_2$ will be substantially coincident and determined in amount by the adjusted force of the spring 62. If the recesses 59 and 61 are arranged to open successively but in close sequence to their respective ports 53 and 51, the difference between pressures $P_1$ and $P_2$ will be small, viz. on the order of 200 to 300 p. s. i. This arrangement is well suited for sustained pressure operation in which the large volume source is unloaded and the small volume source is blown off through the relief valve to the extent required to sustain the pressure. Alternatively, the control edges of the recesses 59 and 60 may be spaced so widely that a large pressure difference will be obtained, viz. on the order of 2000 to 3000 p. s. i. This arrangement is well suited for two-stage pressure operations.

The valve of the present invention is especially advantageous for use with the dual pump 15 having two delivery outlets. If desired, the valve body 10 may be mounted in gasketed relation directly on the pump casing in position to locate the valve passages 11 and 12 in immediate registration with the pump delivery ports. In such arrangement, the conduits 17 and 18 would not be required to be in the form of interposed tubes or passages, and hence within the meaning of the present disclosure, any reference to the conduits 17 and 18 is to be taken as meaning broadly any flow connections establishing intercommunication between the valve and its fluid sources.

Within the specific aspects of the invention, not only is the valve well suited for use with the dual pump 15, but the valve and pump when used together constitute a variable delivery source of pressure fluid advantageous for the widely varying fluid volume and pressure requirements of press operations.

We claim:

1. An unloading and relief valve comprising a body having two separate inlet passages, a pressure delivery passage in constant communication with one of said inlet passages, a cross passage connecting the other of said inlet passages to said delivery passage, and an exhaust passage, a check valve interposed in said cross passage for passing fluid directly from the other of said inlet passages to said delivery passage, and valve means at the down-stream side of said cross passage responsive to the pressure in said delivery passage, said valve means normally blocking said other inlet passage from the exhaust passage and operable upon a predetermined rise in said pressure to connect said other inlet passage to said exhaust passage, said check valve alone being operative to prevent fluid flow through said cross passage upon operation of said valve means, and said valve means being operable upon a further predetermined rise in said pressure to relieve said delivery passage to said exhaust passage.

2. An unloading and relief valve comprising a body having a valve bore and first, second and third sets of ports opening at axially spaced points to said bore, a delivery passage in communication with one end of said bore and having an inlet adapted to be connected to one source of pressure fluid, a second passage in communication with the first set of ports and having an inlet adapted for connection to another source of pressure fluid, and an exhaust passage in communication with said second and third sets of ports, a valve member slidable in said bore and exposed at one end to the pressure in said delivery passage, said end of said plunger having a peripheral recess movable into communication with said third set of ports to provide a pressure relief connection between said delivery passage and said exhaust passage, said plunger being formed intermediate its ends with a peripheral recess always in communication with said second set of ports and movable into communication with said first set of ports to unload said second passage to said exhaust passage, adjustable compression spring means acting on the other end of said plunger in a direction to bias said plunger in opposition to the pressure in said delivery passage whereby to move said recesses out of communication with said first and third sets of ports, and check valve means for passing fluid directly from said second passage to said delivery passage when said first set of ports is blocked.

3. An unloading and relief valve comprising a body having a bore and first and second sets of ports opening at axially spaced points to said bore, a delivery passage in communication with one end of said bore and having an inlet adapted to be connected to one source of pressure fluid, a second passage in communication with the first set of ports and having an inlet adapted for connection to another source of pressure fluid, and an exhaust passage in communication with said second set of ports, a valve member slidable in said port and exposed at one end to the pressure in said delivery passage, said plunger having a first peripheral recess always in communication with said delivery passage and movable into communication with said second set of ports to provide a pressure relief connection between said delivery passage and said exhaust passage, said plunger being formed with a second peripheral recess always in communication with said exhaust passage and movable into communication with said first set of ports to unload said second passage to said exhaust passage, adjustable compression spring means acting on the other end of said plunger in a direction to bias said plunger in opposition to the pressure in said delivery passage whereby to move said recesses out of communication with said sets of ports, and check valve means for passing fluid from said second passage to said delivery passage when said first set of ports is blocked by said valve member.

4. An unloading and relief valve comprising in combination, a body having a valve bore, an exhaust outlet, a pressure delivery outlet always open to one end of bore, a first fluid pressure inlet always open to said delivery outlet, a second fluid pressure inlet having port means in said bore, and a cross passage opening from said second inlet at a point ahead of said port means to said delivery outlet, a valve plunger slidable in said bore, means normally biasing said plunger in one direction for movement progressively first to block said port means and then to block said delivery outlet from said exhaust outlet, said plunger being exposed at one end to the pressure prevailing in said delivery outlet for movement in response to said pressure on a rising gradient progressively first to connect said port means to said exhaust outlet and then said delivery outlet to said exhaust outlet, and a normally closed check valve interposed in said cross passage and operable to permit flow from said second inlet to said delivery outlet when said port means is blocked by said plunger.

JOHN MAURICE TOWLER.
FRANK HATHORN TOWLER.

References Cited in the file of this patent
UNITED STATES PATENTS

| Number | Name | Date |
|---|---|---|
| 1,951,398 | Dearsley | Mar. 20, 1934 |
| 1,982,711 | Vickens | Dec. 4, 1934 |
| 2,549,897 | Evrell | Apr. 24, 1951 |